(12) United States Patent
McKee et al.

(10) Patent No.: US 6,772,372 B2
(45) Date of Patent: Aug. 3, 2004

(54) SYSTEM AND METHOD FOR MONITORING UNALIGNED MEMORY ACCESSES

(75) Inventors: Bret A. McKee, Fort Collins, CO (US); John M. Kessenich, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 540 days.

(21) Appl. No.: 09/800,283

(22) Filed: Mar. 6, 2001

(65) Prior Publication Data

US 2002/0129301 A1 Sep. 12, 2002

(51) Int. Cl.⁷ .................................................. G06F 11/00
(52) U.S. Cl. ....................................... 714/42; 712/244
(58) Field of Search ............................... 714/42, 47, 39, 714/37, 5–7, 34, 35; 711/133, 159; 712/244, 245, 227

(56) References Cited

U.S. PATENT DOCUMENTS

| | | | |
|---|---|---|---|
| 4,809,160 A | | 2/1989 | Mahon et al. |
| 4,912,707 A | * | 3/1990 | Kogge et al. ................. 714/17 |
| 5,134,701 A | | 7/1992 | Kuzara et al. |
| 5,201,043 A | * | 4/1993 | Crawford et al. ............. 714/49 |
| 5,450,586 A | | 9/1995 | Anderson et al. |
| 5,465,335 A | | 11/1995 | McKee et al. |
| 5,596,717 A | | 1/1997 | Marshall, Jr. .......... 395/185.06 |
| 5,649,142 A | * | 7/1997 | Lavelle et al. ............... 711/209 |
| 5,742,755 A | | 4/1998 | Hervin .................. 395/185.06 |
| 5,832,205 A | * | 11/1998 | Kelly et al. .................... 714/53 |
| 5,915,114 A | | 6/1999 | McKee et al. |
| 6,085,312 A | * | 7/2000 | Abdallah et al. ........... 712/208 |
| 6,205,560 B1 | * | 3/2001 | Hervin et al. ................. 714/34 |
| 6,282,637 B1 | * | 8/2001 | Chan et al. ................. 712/223 |
| 6,587,966 B1 | * | 7/2003 | Chaiken et al. ............... 714/34 |

FOREIGN PATENT DOCUMENTS

GB        2230118        10/1990

OTHER PUBLICATIONS

Hewlett–Packard Product Manual, "Overview of IA–64 Architecture".
Hewlett–Packard Product Manual, "IA–64 Software Conventions and Runtime Architecture", Version 1.0 (Aug. 31, 1999).
Intel Product Manual, "Intel IA–64 Architecture Software Developer's Manual", vol. 1: IA–64 Application Architecture, Revision 1:1 (Jul. 2000).
Intel Product Manual, "Intel IA–64 Architecture Software Developer's Manual", vol. 2: IA–64 System Architecture, Revision 1.1 (Jul. 2000).
Intel Product Manual, "Intel IA–64 Architecture Software Developer's Manual", vol. 3: IA–64 Instruction Set Reference, Revision 1.1 (Jul. 2000).
Intel Product Manual, "Intel IA–64 Architecture Software Developer's Manual", vol. 4: Itanium Processor Programmer Guide, Revision 1.1 (Jul. 2000).
Intel Product Manual, "Intel IA–64 Architecture Software Developer's Manual", Itanium Processor Microarchitecture Reference for Software Optimization (Aug. 2000).

* cited by examiner

*Primary Examiner*—Nadeem Iqbal

(57) ABSTRACT

A system monitors unaligned memory accesses by a processor of a computer system. The processor automatically generates a fault when attempting an unaligned memory access. Unaligned memory access faults are disabled in response to a fault generated by a first faulting instruction. The first faulting instruction is executed. A trap is generated by executing the first faulting instruction. Unaligned memory access faults are enabled in response to the trap.

32 Claims, 3 Drawing Sheets

SYSTEM AND METHOD FOR MONITORING UNALIGNED MEMORY ACCESSES

THE FIELD OF THE INVENTION

The present invention relates to monitoring unaligned memory accesses in computer systems, and more particularly to monitoring unaligned memory accesses in computer systems using hardware single-stepping.

BACKGROUND OF THE INVENTION

Computer systems include at least one processor and memory. The memory stores application program instructions, data, and an operating system. The operating system controls the processor and the memory for system operations and for executing the application program instructions.

Data stored in a memory of a computer system can be stored along natural boundaries, or may cross boundaries. For best performance, data should be aligned on natural memory boundaries. When a data item crosses a natural boundary and is stored on more than one line, multiple accesses are required to obtain the data, thereby decreasing system performance. Software preferably aligns data values to avoid possible performance degradation.

It would be desirable to monitor, count and trace unaligned memory accesses by an application program, for purposes of modifying the software to increase performance or for other purposes. One current solution for monitoring the execution of instructions in an application program is to build a software emulator to handle faulting instructions so that execution can continue when a fault occurs. However, this solution is very complex, and requires software to be developed that can update the processor state as if a faulting instruction had been executed.

Software debuggers have also been developed to monitor the execution of application program instructions. Software debuggers typically make use of a single-step feature. A single-step feature may be implemented in software, or may be a hardware feature provided by the processor. A single-step feature has been used by software debuggers to step through an application program one instruction at a time, monitor how the processor state changes after each instruction, and identify errors based on the changes in the processor state. A hardware single-step feature has not previously been used as part of a solution for monitoring, counting, and tracing unaligned memory accesses in an application program.

It would be desirable to provide a simplified solution for monitoring, counting and tracing unaligned memory accesses by an application program, without the requirement of building a complex software emulator.

SUMMARY OF THE INVENTION

The present invention provides a computer system and method for monitoring unaligned memory accesses by a processor of a computer system. The processor automatically generates a fault when attempting an unaligned memory access. Unaligned memory access faults are disabled in response to a fault generated by a first faulting instruction. The first faulting instruction is executed. A trap is generated by executing the first faulting instruction. Unaligned memory access faults are enabled in response to the trap.

In one embodiment, unaligned memory access faults are enabled before executing the first faulting instruction.

In one embodiment, a fault handler is invoked to process the fault. The step of disabling unaligned memory access faults is performed by the fault handler.

In one embodiment, a trap handler is invoked to process the trap. The step of enabling unaligned memory access faults is performed by the trap handler.

In one embodiment, a single-step mode of the processor is enabled in response to the fault. The single-step mode is enabled by setting a field in a system register of the processor.

In one embodiment, state information is stored in response to the fault. The state information includes the number of instructions that caused a fault and an identification of instructions that caused a fault.

One form of the present invention provides a method of executing instructions by a processor of a computer system controlled by an operating system. An unaligned memory access fault is generated based on the attempted execution of a first instruction. Unaligned memory access faults are disabled in response to the unaligned memory access fault. A single-step mode is enabled in response to the unaligned memory access fault. The first instruction is executed, thereby generating a single-step trap. Unaligned memory access faults are enabled in response to the single-step trap. The single-step mode is disabled in response to the single-step trap.

One form of the present invention provides a computer system including a processor. A memory stores an application program having application instructions. An operating system stored in the memory controls the processor. The operating system includes a fault handler and a trap handler. The fault handler disables unaligned memory access faults and enables a single-step mode in response to an unaligned memory access fault. The trap handler enables unaligned memory access faults and disables the single-step mode in response to a single-step trap.

One form of the present invention provides a computer readable medium containing an operating system for controlling a processor of a computer system to perform a method of monitoring unaligned memory accesses. The method includes disabling unaligned memory access faults in response to a fault generated by a first faulting instruction. The first faulting instruction is executed. A trap is generated by executing the first faulting instruction. Unaligned memory access faults are enabled in response to the trap.

The present invention provides a simplified solution for monitoring, counting and tracing unaligned memory accesses by an application program. In one embodiment, a hardware single-step feature of a processor is used to temporarily enable and disable unaligned memory accesses for particular instructions. The invention eliminates the need for building a complex software emulator.

DESCRIPTION OF THE PREFERRED EMBODIMENTS

In the following detailed description of the preferred embodiment, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
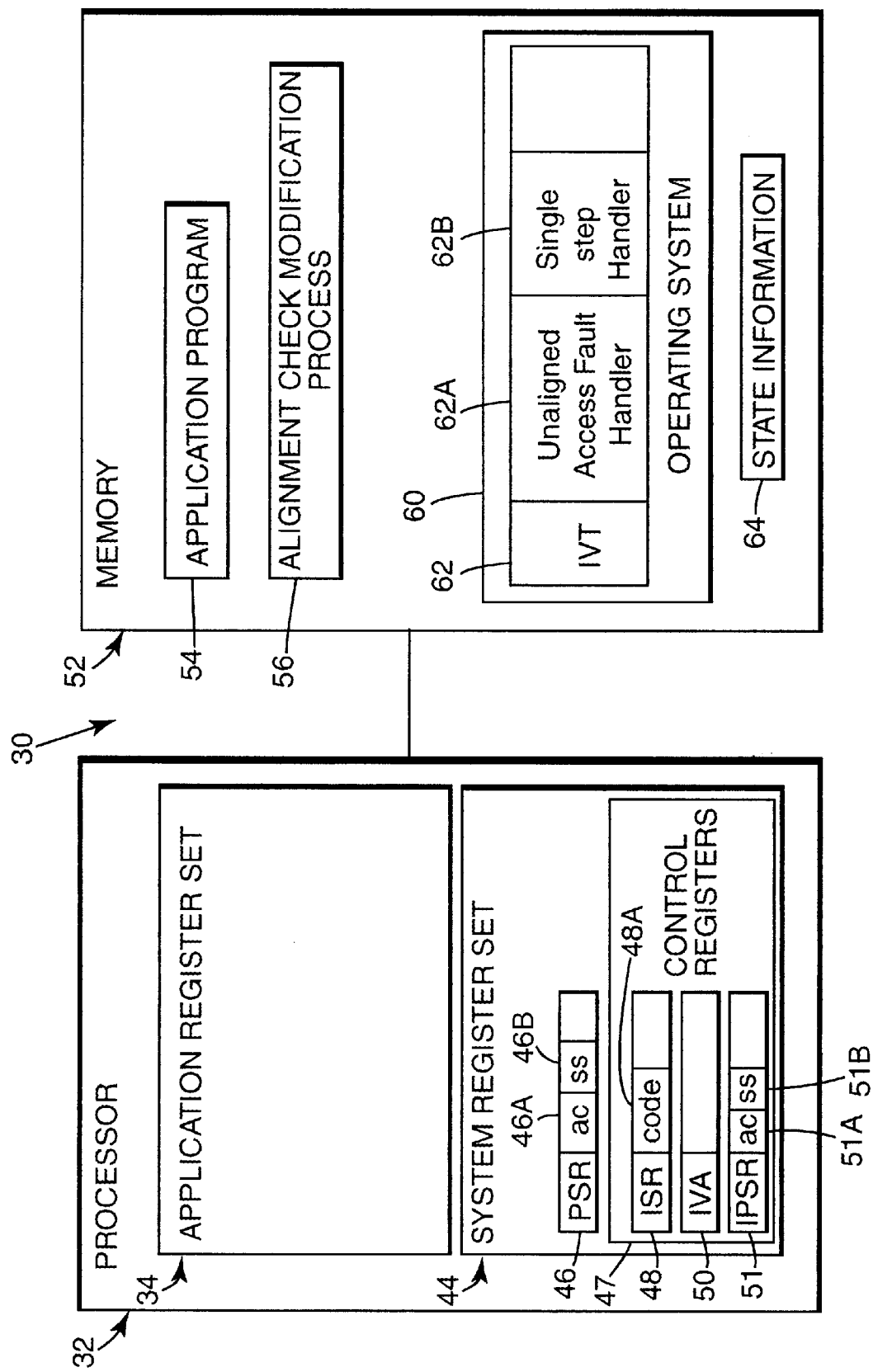
FIG. 1 is a block diagram of a computer system according to the present invention, which monitors unaligned memory accesses.

A computer system according to the present invention is illustrated generally at 30 in FIG. 1. Computer system 30 includes at least one processor, such as processor 32, for performing sequences of logical operations. Computer system 30 also includes memory 52 for storing instructions and data for use by processor 32. An operating system 60 is stored in memory 52 and controls processor 32 and memory 52 for system operations and for executing application program instructions stored in memory 52. Memory 52 typically includes random access memory (RAM), non-volatile memory, and a hard disk drive, but can include any known type of memory storage.

Processor 32 includes an application register set 34 and a system register set 44. An architectural state of computer system 30 is represented by application register set 34, system register set 44, and memory 52. Application register set 34 includes registers available to application programs stored in memory 52. System register set 44 provides system register resources for process control, interruption handling, protection, debugging, performance monitoring, and the like. System register set 44 is generally only visible to operating system 60.

Example registers that can be included in application register set 34 include general registers, floating point registers, compare result registers, branching information registers, instruction pointer, current frame marker, process identifiers, and user mask.

Example registers that can be included in system register set 44 include region registers, protection key registers, debug break point registers, machine specific registers, and control registers. System register set 44 includes a processor status register (PSR) 46, which maintains control information to define the current execution environment for the current running process of processor 32.

PSR 46 includes an alignment check (ac) field 46A. When PSR.ac field 46A is set, unaligned memory accesses result in an unaligned memory access fault. There are several different types of unaligned memory accesses that can result in an unaligned memory access fault, such as accesses that cross a cache line or page boundary, and unaligned semaphore references. When PSR.ac field 46A is set, data memory references that are not aligned on a boundary the size of the operand result in an unaligned memory access fault. For example, 1, 2, 4, 8, 10, and 16-byte datums should be aligned on 1, 2, 4, 8, 10, and 16 byte boundaries, respectively, to avoid generation of an unaligned memory access fault. When PSR.ac field 46A is set, and the data address being reference is not aligned to the natural size of a load, store, or semaphore operation, an unaligned memory access fault is generated.

Processor 32 can single-step through application instructions by enabling the single-step field (PSR.ss) 46B of PSR 46. When single-stepping is enabled, successful execution of an instruction results in a single-step trap.

System register set 44 includes control registers 47. Control registers 47 include an interruption status register (ISR) 48, an interruption vector address (IVA) register 50, and an interruption processor status register (IPSR) 51.

ISR 48 receives information from processor 32 related to the nature of an interruption. ISR 48 contains information about the excepting instruction and its properties, such as whether the excepting instruction was performing a read, write, execute, speculative, or non-access operation. Fault and trap specific information is stored in a code field (ISR.code) 48A of ISR 48. IVA register 50 specifies a base address of interruption vector table (IVT) 62 (discussed below). IPSR 51 receives the value of PSR 46 on an interruption. IPSR 51 is used to update PSR 46 after a return from interruption. Like PSR 46, IPSR 51 includes an alignment check (ac) field 51A, and a single-step (ss) field 51B.

Memory 52 stores an application program 54 having application instructions. Memory 52 also stores alignment check modification process 56. Operating system 60, which is stored in memory 52, includes IVT 62. IVT 62 stores a plurality of interruption handlers. IVT 62 stores unaligned access fault handler 62A and single-step trap handler 62B. In addition to using IVT 62 to handle particular interruptions, other interruptions may be handled by other processes.

An interruption is an event that causes the hardware to automatically stop execution of the current instruction stream, and start execution at an instruction address corresponding to an interruption handler for that interruption. Interruptions include faults and traps. A fault occurs when operating system intervention is required before the current instruction can be executed. A trap occurs when operating system intervention is required after the current instruction has completed. Interruptions are handled by operating system 60 at an address determined by the base location of IVT 62 (specified by IVA register 50), offset by an amount based on the particular interruption that occurred. Each interruption has its own architected offset into IVT 62.

When an interruption occurs, processor 32 stops execution at the current instruction pointer (IP), sets a current privilege level to 0 (the highest privilege level), and begins fetching instructions from the address of the entry point to the interruption handler in IVT 62 for the particular interruption that occurred. Interruption handlers may be contained entirely within IVT 62, or handlers may branch to code outside IVT 62 if more space is needed.

The location of interruption handlers within IVT 62 is specified by an interruption vector. In one embodiment, there are more interruptions than there are interruption vectors in IVT 62. Thus, there is a many-to-one relationship between interruptions and interruption vectors. A handler associated with a particular interruption vector can determine the particular interruption that occurred by reading ISR.code 48A. After an interruption has been processed by an interruption handler, a return from interruption (rfi) instruction is executed by processor 32, and previously stored processor state information is used to restore the processor state.

In one embodiment, processor 32 generates an unaligned reference vector when an unaligned access fault occurs. An unaligned access fault is also referred to as an unaligned data reference fault. Based on the base address of IVT 62 contained in IVA register 50, and the offset associated with the unaligned reference vector, processor 32 jumps to unaligned access fault handler 62A to handle the unaligned access fault. Unaligned access fault handler 62A is discussed in further detail below.

In one embodiment, processor 32 generates a single-step trap interruption vector when a single-step trap occurs. Based on the base address of IVT 62 contained in IVA register 50, and the offset associated with the single-step trap interruption vector, processor 32 jumps to single-step trap handler 62B to handle the single-step trap. Single-step trap handler 62B is discussed in further detail below.

Figure 2:
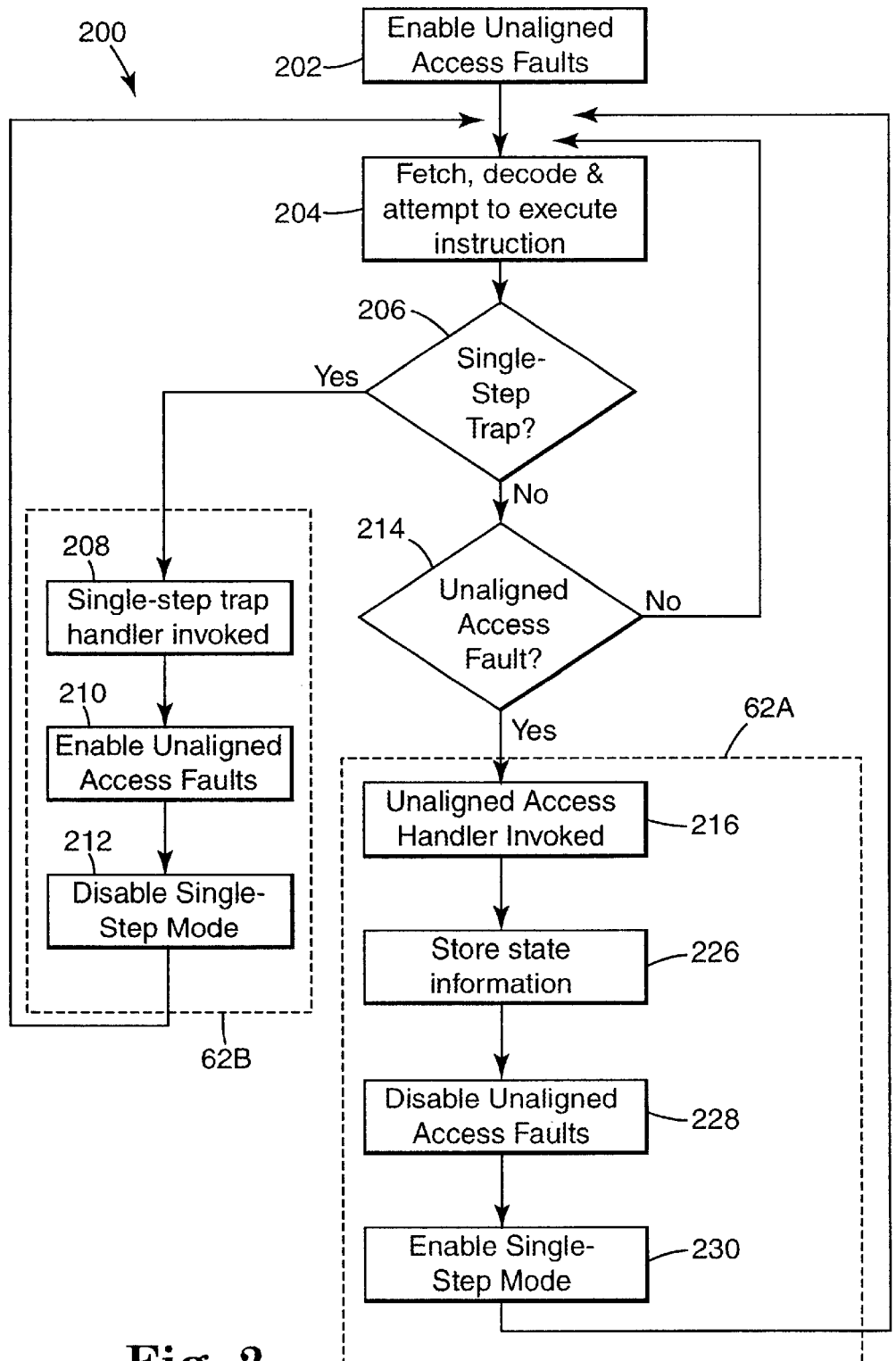
FIG. 2 is a flow diagram illustrating a process for monitoring unaligned memory accesses by an application program according to the present invention.

FIG. 2 illustrates a flow diagram of a process 200 for monitoring unaligned memory accesses by application program 54 according to the present invention. A first step in process 200 is enabling unaligned access faults. (Step 202). In one embodiment, processor 32 enables unaligned access faults by setting PSR.ac field 46A in PSR 46.

Next, processor 32 fetches, decodes and attempts to execute an instruction from application program 54 in step 204. In step 206, if the single-step trap field (PSR.ss 46B) is enabled, successful execution of the instruction results in a single-step trap, and the single-step trap handler 62B is invoked in step 208 (discussed below). If the attempted execution of the instruction results in the generation of an unaligned reference vector, unaligned access fault handler 62A is invoked in step 216. If neither a single-step trap nor an aligned reference vector is generated, process 200 jumps to step 204, and the next instruction is fetched, decoded, and execution of that instruction is attempted.

When invoked in step 216, unaligned access fault handler 62A stores state information 64 in memory 52 in step 226. In one embodiment, state information 64 includes processor state information as specified in PSR 46. State information 64 preferably also includes any information that may be helpful in later analyzing the unaligned access fault, including which instruction caused a fault, what the state of processer 32 was when an unaligned access fault occurred, the number of unaligned access faults that occurred during execution of application program 54, as well as other information.

Figure 3:
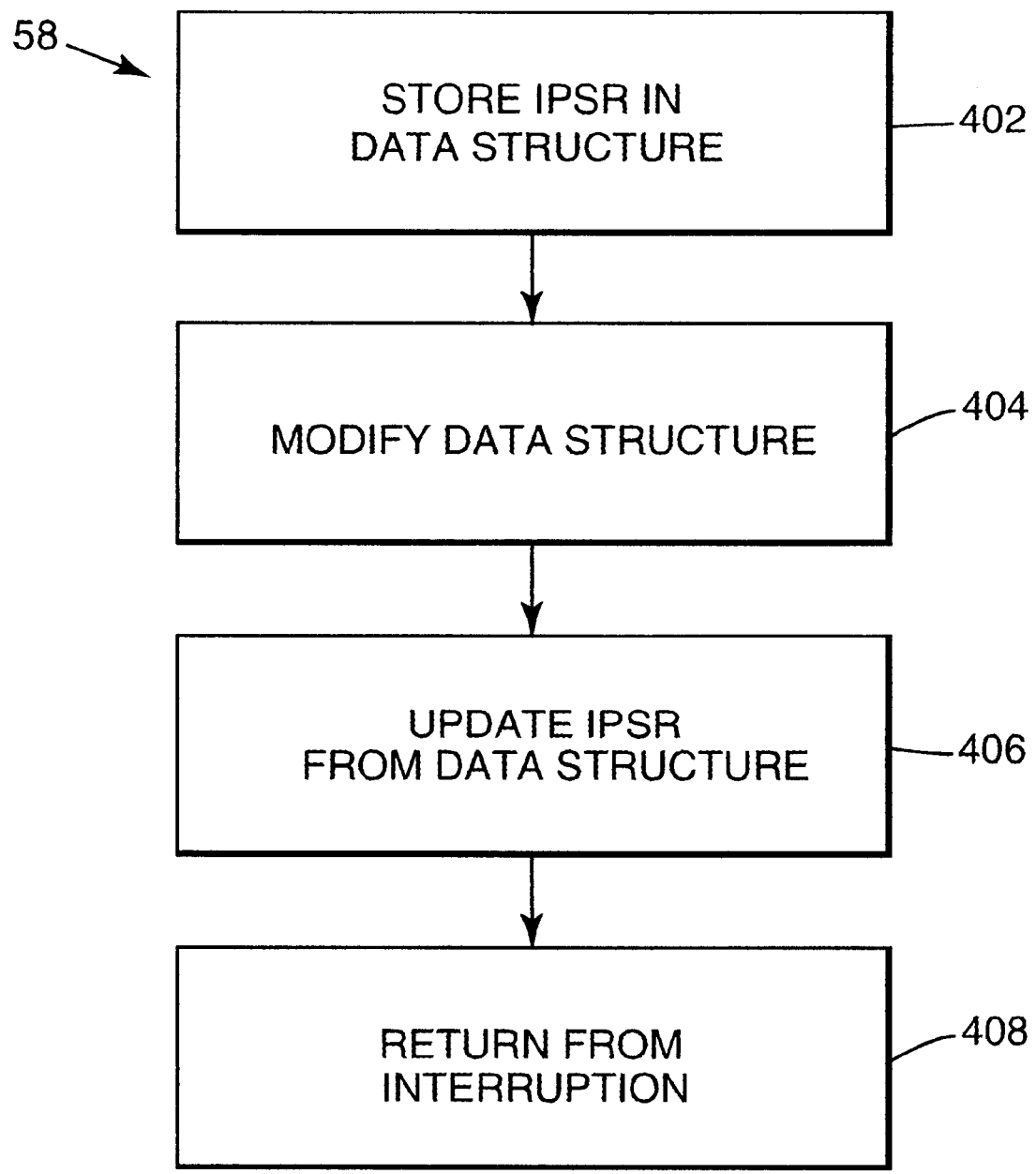
FIG. 3 is a flow diagram illustrating one embodiment of an alignment check modification process.

Next, in step 228, unaligned access fault handler 62A disables unaligned access faults. In one embodiment, unaligned access fault handler 62A disables unaligned access faults by executing alignment check modification process 56. FIG. 3 shows a flow diagram of one embodiment of an alignment check modification process 56. Alignment check modification process 56 includes step 402 of storing the value of IPSR.ac 51A in a data structure. In step 404, the value in the data structure representing IPSR.ac 51A is changed to the desired value (e.g., 0) to disable unaligned access faults. In step 406, IPSR 51 is updated based on the data stored in the data structure. After the updating has been performed, IPSR.ac 51A contains the desired value to disable unaligned access faults (e.g., IPSR.ac 51A=0). In step 408, a return from interruption (rfi) is performed. A return from interruption causes PSR 46 to be updated from IPSR 51. Thus, after the return from interruption, PSR.ac 46A contains the desired value to disable unaligned access faults (e.g., PSR.ac 46A=0).

Lastly, as shown in FIG. 2, in step 230, unaligned access fault handler 62A enables single-step mode. Unaligned access fault handler 62A enables single-step mode by enabling the single step field PSR.ss 46B in PSR 46. In one embodiment, unaligned access fault handler 62A enables single step field PSR.ss 46B in the same manner and in the same process as unaligned access fault handler 62A modifies PSR.ac field 46A (discussed above with reference to FIG. 3). Specifically, in step 402, unaligned access fault handler 62A stores the value of IPSR.ss 51B in a data structure. In step 404, the value in the data structure representing IPSR.ss 51B is then changed to enable single-stepping. In step 406, IPSR 51 is updated based on the data stored in the data structure. After the updating has been performed, IPSR.ss 51B=1. In step 408, a return from interruption (rfi) is performed. A return from interruption causes PSR 46 to be updated from IPSR 51. Thus, after the return from interruption, PSR.ss 46B contains the desired value (e.g., PSR.ss 46B=1).

Next, flow returns to step 204 to execute the current instruction. After execution of the current instruction, since the single-step trap field PSR.ss 46B has been enabled, a single-step trap is generated at step 206, and single-step trap handler 62B is invoked at step 208. In step 210, single-step trap handler 62B enables unaligned access faults by setting PSR.ac field 46A in PSR 46. In step 212, single-step trap handler 62B disables single-stepping. In one embodiment, single-step trap handler 62B disables single-stepping by disabling single-step trap field PSR.ss 46B in PSR 46 in the same manner, discussed above, as PSR.ss 46B is enabled. In one embodiment, single-step trap handler 62 also stores state information 64, including the current state of PSR 46 prior to any modifications by single-step trap handler 62B. Flow is then returned to step 204, where the next instruction is fetched, decoded, and execution of the instruction is attempted.

The present invention is not limited to one type of processor, but rather applies to any processor that provides single-step and interruption functionality, including, but not limited to, an IA-64 processor architecture.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of monitoring unaligned memory accesses by a processor of a computer system, the processor automatically generating an unaligned memory access fault when attempting an unaligned memory access, the method comprising:

disabling unaligned memory access faults in response to a fault generated by a first faulting instruction;

executing the first faulting instruction;

generating a trap by executing the first faulting instruction; and enabling unaligned memory access faults in response to the trap.

2. The method of claim 1, and further comprising:

enabling unaligned memory access faults before executing the first faulting instruction.

3. The method of claim 1, and further comprising:

invoking a fault handler to process the fault.

4. The method of claim 3, wherein the step of disabling unaligned memory access faults is performed by the fault handler.

5. The method of claim 1, and further comprising:

invoking a trap handler to process the trap.

6. The method of claim 5, wherein the step of enabling unaligned memory access faults is performed by the trap handler.

7. The method of claim 1, and further comprising:

enabling a single-step mode of the processor in response to the fault.

8. The method of claim 7, and further comprising:

setting a field in a system register of the processor to enable the single-step mode.

9. The method of claim 1, and further comprising:

storing state information in response to the fault.

10. The method of claim 9, wherein the state information includes the number of instructions that caused a fault and an identification of instructions that caused a fault.

11. A method of executing instructions by a processor of a computer system controlled by an operating system, the method comprising:

generating an unaligned memory access fault based on the attempted execution of a first instruction;

disabling unaligned memory access faults in response to the unaligned memory access fault;

enabling a single-step mode in response to the unaligned memory access fault;

executing the first instruction, thereby generating a single-step trap;

enabling unaligned memory access faults in response to the single-step trap; and disabling the single-step mode in response to the single-step trap.

12. The method of claim 11, and further comprising:

enabling unaligned memory access faults before executing the instructions.

13. The method of claim 11, and further comprising:

invoking a fault handler to process the unaligned memory access fault.

14. The method of claim 13, wherein the steps of disabling unaligned memory access faults and enabling a single-step mode are performed by the fault handler.

15. The method of claim 11, and further comprising:

invoking a trap handler to process the single-step trap.

16. The method of claim 15, wherein the steps of enabling unaligned memory access faults and disabling the single-step mode are performed by the trap handler.

17. The method of claim 11, and further comprising:

setting a field in a system register of the processor to enable the single-step mode.

18. The method of claim 11, and further comprising:

storing state information in response to the unaligned memory access fault.

19. The method of claim 18, wherein the state information includes the number of instructions that caused a fault and an identification of instructions that caused a fault.

20. A computer system comprising:

a processor;

a memory storing an application program having application instructions; and an operating system stored in the memory for controlling the processor, the operating system including a fault handler and a trap handler, the fault handler disabling unaligned memory access faults and enabling a single-step mode in response to an unaligned memory access fault, the trap handler enabling unaligned memory access faults and disabling the single-step mode in response to a single-step trap.

21. The computer system of claim 20, wherein the fault handler stores state information in the memory.

22. The computer system of claim 21, wherein the state information includes the number of instructions that caused a fault and an identification of instructions that caused a fault.

23. A computer readable medium containing instructions for an operating system for controlling a processor of a computer system to perform a method of monitoring unaligned memory accesses, the method comprising:

disabling unaligned memory access faults in response to a fault generated by a first faulting instruction;

executing the first faulting instruction;

generating a trap by executing the first faulting instruction; and enabling unaligned memory access faults in response to the trap.

24. The computer readable medium of claim 23, wherein the method further comprises:

enabling unaligned memory access faults before executing the first faulting instruction.

25. The computer readable medium of claim 23, wherein the method further comprises:

invoking a fault handler to process the fault.

26. The computer readable medium of claim 25, wherein the step of disabling unaligned memory access faults is performed by the fault handler.

27. The computer readable medium of claim 23, wherein the method further comprises:

invoking a trap handler to process the trap.

28. The computer readable medium of claim 27, wherein the step of enabling unaligned memory access faults is performed by the trap handler.

29. The computer readable medium of claim 23, wherein the method further comprises:

enabling a single-step mode of the processor in response to the fault.

30. The computer readable medium of claim 29, wherein the method further comprises:

setting a field in a system register of the processor to enable the single-step mode.

31. The computer readable medium of claim 23, wherein the method further comprises:

storing state information in response to the fault.

32. The computer readable medium of claim 31, wherein the state information includes the number of instructions that caused a fault and an identification of instructions that caused a fault.

* * * * *